(12) United States Patent
Oesterreicher et al.

(10) Patent No.: US 7,680,938 B2
(45) Date of Patent: *Mar. 16, 2010

(54) VIDEO ON DEMAND DIGITAL SERVER LOAD BALANCING

(76) Inventors: Richard T. Oesterreicher, 3871 Midshore Dr., Naples, FL (US) 34109; Craig Murphy, 7614 130th Ave., NE., Kirkland, WA (US) 98033

(*) Notice: Subject to any disclaimer, the term of this patent is extended or adjusted under 35 U.S.C. 154(b) by 0 days.

This patent is subject to a terminal disclaimer.

(21) Appl. No.: 11/468,613

(22) Filed: Aug. 30, 2006

(65) Prior Publication Data

US 2007/0124476 A1 May 31, 2007

Related U.S. Application Data

(63) Continuation of application No. 10/609,426, filed on Jun. 27, 2003.

(51) Int. Cl.
*G06F 15/173* (2006.01)
(52) U.S. Cl. .................................................. 709/226
(58) Field of Classification Search ......... 709/217–219, 709/227–229, 226
See application file for complete search history.

(56) References Cited

U.S. PATENT DOCUMENTS

| | | |
|---|---|---|
| 5,353,430 A | 10/1994 | Lautzenheiser |
| 5,561,823 A | 10/1996 | Anderson |
| 5,586,291 A | 12/1996 | Lasker et al. |
| 5,592,612 A | 1/1997 | Birk ............................. 714/6 |
| 5,761,458 A | 6/1998 | Young et al. |
| 5,774,668 A | 6/1998 | Choquier et al. ............ 709/223 |
| 5,809,239 A | 9/1998 | Dan et al. .................... 709/203 |
| 5,996,025 A | 11/1999 | Day et al. .................... 719/328 |
| 6,038,641 A * | 3/2000 | Zangenehpour ............. 711/119 |
| 6,070,191 A | 5/2000 | Narendran et al. .......... 709/226 |
| 6,092,178 A | 7/2000 | Jindal et al. |

(Continued)

FOREIGN PATENT DOCUMENTS

GB 2343348 3/2000

(Continued)

OTHER PUBLICATIONS

Aversa et al., "Load balancing a Cluster of Web Servers," *Boston University*, 2000.

(Continued)

*Primary Examiner*—Benjamin R. Bruckart
(74) *Attorney, Agent, or Firm*—Woodcock Washburn LLP

(57) ABSTRACT

A system and method for load balancing a plurality of servers is disclosed. In a preferred embodiment, a plurality of servers in a video-on-demand or other multi-server system are divided into one or more load-balancing groups. Each server preferably maintains state information concerning other servers in its load-balancing group including information concerning content maintained and served by each server in the group. Changes in a server's content status or other state information are preferably proactively delivered to other servers in the group. When a content request is received by any server in a load-balancing group, it evaluates the request in accordance with a specified algorithm to determine whether it should deliver the requested content itself or redirect the request to another server in its group. In a preferred embodiment, this determination is a function of information in the server's state table.

25 Claims, 9 Drawing Sheets

U.S. PATENT DOCUMENTS

| | | | |
|---|---|---|---|
| 6,148,368 A | 11/2000 | DeKoning | |
| 6,182,138 B1 | 1/2001 | Aoki | 709/226 |
| 6,185,598 B1* | 2/2001 | Farber et al. | 709/200 |
| 6,185,619 B1 | 2/2001 | Joffe et al. | 709/229 |
| 6,189,080 B1 | 2/2001 | Ofer | |
| 6,223,206 B1 | 4/2001 | Dan et al. | 718/105 |
| 6,327,614 B1 | 12/2001 | Asano et al. | |
| 6,370,584 B1* | 4/2002 | Bestavros et al. | 709/238 |
| 6,377,996 B1* | 4/2002 | Lumelsky et al. | 709/231 |
| 6,466,978 B1 | 10/2002 | Mukherjee et al. | 709/225 |
| 6,535,518 B1 | 3/2003 | Hu et al. | |
| 6,587,921 B2 | 7/2003 | Chiu et al. | |
| 6,665,704 B1 | 12/2003 | Singh | |
| 6,718,361 B1 | 4/2004 | Basani et al. | 709/201 |
| 6,728,850 B2 | 4/2004 | Gotoh et al. | |
| 6,748,447 B1* | 6/2004 | Basani et al. | 709/244 |
| 6,760,763 B2 | 7/2004 | Jennings et al. | 709/224 |
| 6,799,214 B1* | 9/2004 | Li | 709/226 |
| 6,862,624 B2* | 3/2005 | Colby et al. | 709/226 |
| 6,986,018 B2 | 1/2006 | O'Rourke et al. | |
| 7,020,745 B1* | 3/2006 | Kedem et al. | 711/118 |
| 7,043,558 B2 | 5/2006 | Yoshida et al. | |
| 7,080,158 B1* | 7/2006 | Squire | 709/245 |
| 7,099,915 B1 | 8/2006 | Tenereillo et al. | 709/203 |
| 7,213,062 B1* | 5/2007 | Raciborski et al. | 709/223 |
| 7,233,978 B2 | 6/2007 | Overton et al. | 709/217 |
| 7,398,312 B1 | 7/2008 | Guo et al. | |
| 7,500,055 B1 | 3/2009 | Oesterreicher et al. | |
| 2002/0002622 A1* | 1/2002 | Vange et al. | 709/245 |
| 2002/0010783 A1 | 1/2002 | Primak et al. | 709/228 |
| 2002/0040402 A1 | 4/2002 | Levy-Abegnoli et al. | 709/229 |
| 2002/0059371 A1 | 5/2002 | Jamail et al. | 709/203 |
| 2002/0116481 A1* | 8/2002 | Lee | 709/220 |
| 2002/0120743 A1* | 8/2002 | Shabtay et al. | 709/226 |
| 2002/0161890 A1 | 10/2002 | Chen | 709/226 |
| 2002/0169827 A1 | 11/2002 | Ulrich et al. | |
| 2003/0055910 A1 | 3/2003 | Amini et al. | |
| 2003/0088811 A1* | 5/2003 | Cherabuddi et al. | 714/42 |
| 2003/0115346 A1* | 6/2003 | McHenry et al. | 709/229 |
| 2003/0158908 A1 | 8/2003 | Jacobs et al. | 709/214 |
| 2003/0195984 A1* | 10/2003 | Zisapel et al. | 709/238 |
| 2004/0010588 A1 | 1/2004 | Slater et al. | 709/224 |
| 2004/0024941 A1 | 2/2004 | Olarig et al. | |
| 2004/0088412 A1* | 5/2004 | John et al. | 709/226 |
| 2004/0093288 A1 | 5/2004 | Strothmann et al. | |
| 2004/0125133 A1* | 7/2004 | Pea et al. | 345/751 |

FOREIGN PATENT DOCUMENTS

| | | | |
|---|---|---|---|
| GB | 2342263 A | * | 4/2000 |

OTHER PUBLICATIONS

Bestavros et al., "Distributed Packet Rewriting and its Application to Scalable Server Architectures," *IEEE*, Oct. 1998.
Brisco, T., "DNS Support for Load Balancing," *RFC 1794*, Apr. 1995.
Cisco Systems, Inc., "Load Balancing—A Multifaceted Solution for Improving Server Availability," http://www.cisco.com/warp/public/cc/pd/cxsr/400/tech/lobal_wp.pdf, 1998.
Katz et al., "A Scalable HTTP Server: The NCSA Prototype," *First International WWW conference*, May 1994.
U.S. Appl. No. 11/469,184, filed Aug. 31, 2000, Oesterriecher et al.
U.S. Appl. No. 10/609,426, filed Jun. 27, 2003, Oesterriecher et al.
United States Patent and Trademark Office: Non-Final Office Action dated Aug. 4, 2005, U.S. Appl. No. 10/609,433, filed Jun. 27, 2003.
United States Patent and Trademark Office: Final Office Action dated Dec. 8, 2005, U.S. Appl. No. 10/609,433, filed Jun. 27, 2003.
United States Patent and Trademark Office: Non-Final Office Action dated Apr. 25, 2006, U.S. Appl. No. 10/609,433, filed Jun. 27, 2003.
United States Patent and Trademark Office: Final Office Action dated Nov. 14, 2006, U.S. Appl. No. 10/609,433, filed Jun. 27, 2003.
United States Patent and Trademark Office: Non-Final Office Action dated Mar. 27, 2007, U.S. Appl. No. 10/609,433, filed Jun. 27, 2003.
United States Patent and Trademark Office: Final Office Action dated Aug. 7, 2007, U.S. Appl. No. 10/609,433, filed Jun. 27, 2003.
United States Patent and Trademark Office: Notice of Allowance dated Jan. 31, 2008, U.S. Appl. No. 10/609,433, filed Jun. 27, 2003.
United States Patent and Trademark Office: Notice of Allowance dated Oct. 21, 2008, U.S. Appl. No. 10/609,433, filed Jun. 27, 2003.
United States Patent and Trademark Office: Non-Final Office Action dated Dec. 29, 2006, U.S. Appl. No. 10/609,426.
United States Patent and Trademark Office: Final Office Action dated Jun. 1, 2007, U.S. Appl. No. 10/609,426.
United States Patent and Trademark Office: Non-Final Office Action dated Mar. 12, 2008, U.S. Appl. No. 10/609,426.
United States Patent and Trademark Office: Final Office Action dated Oct. 14, 2008, U.S. Appl. No. 10/609,426.
United States Patent and Trademark Office: Non-Final Office Action dated Mar. 10, 2009, U.S. Appl. No. 10/609,426.
United States Patent and Trademark Office: Notice of Allowance dated Sep. 15, 2009, U.S. Appl. No. 10/609,426.

* cited by examiner

310

| Server Name | SLB Para1 | SLB Para2 | SLB ParaN |
|---|---|---|---|
| Server A | (data) | (data) | (data) |
| Server B | (data) | (data) | (data) |
| Server C | (data) | (data) | (data) |

320

| Server Name | SLB Para1 | SLB Para2 | SLB ParaN |
|---|---|---|---|
| Server D | (data) | (data) | (data) |
| Server E | (data) | (data) | (data) |
| Server F | (data) | (data) | (data) |

| Server | Status | Bandwidth incoming | Bandwidth outgoing | Storage usage | Memory usage | CPU utilization | Asset 1 | Asset 2 | ... |
|---|---|---|---|---|---|---|---|---|---|
| A | up | 47 | 275 | 34% | 37% | 40% | Dare Devil | Casablanca | |
| B | up | 24 | 145 | 25% | 22% | 27% | Casablanca | Spiderman | |
| C | up | 13 | 396 | 56% | 60% | 64% | Dare Devil | Spiderman | |

Fig. 8

VIDEO ON DEMAND DIGITAL SERVER LOAD BALANCING

CROSS REFERENCE TO RELATED APPLICATIONS

This applications is a continuation of U.S. applicaton Ser. No. 10/609,426, filed Jun. 27, 2003, and entitled "System and Method for Digital Media Server Load Balancing."

FIELD OF THE INVENTION

This invention relates to the field of load balancing.

BACKGROUND OF THE INVENTION

Load balancing techniques exist to ensure that individual servers in multi-server systems do not become overloaded and that services retain high availability. Load balancing is especially important where it is difficult to predict the number and timing of requests that will require processing.

Most current load-balancing schemes employ simple parameters to distribute network traffic across a group of servers. These parameters are usually limited to load amount (measured by the number of received requests), server "health" or hardware status (measured by processor temperature or functioning random access memory), and server availability.

One common load-balancing architecture employs a supervisor/subordinate approach. In this architecture, a control hierarchy of devices is established in a load-balancing domain. Each server in the system is assigned to a load-balancing group that includes a central device for monitoring the status of servers in its group. The supervisor acts as the gatekeeper for requests entering the group and delegates each request to an appropriate server based on the server's relative status to that of other servers in the group.

One negative aspect of this approach is that it introduces a single point of failure into the load-balancing process. If the supervisor goes offline for any reason, incoming requests cannot be serviced. To ameliorate this problem, some load-balancing schemes employ a secondary supervisor to handle requests when the primary supervisor is unavailable. A secondary supervisor, however, introduces extra cost in terms of physical equipment and administration.

One of the earliest forms of load balancing, popular in the early 1990's, is commonly referred to as domain name service (DNS) round robin. This load-balancing scheme, described in connection with FIG. 1, represents an extension of the standard domain name resolution technique primarily used by Internet Web servers experiencing extremely high usage.

As shown in FIG. 1, in step 110, a client requests data from a DNS server. In step 120, the domain name server resolves the requested server name into a series of server addresses. Each address in the series corresponds to a server belonging to a single load-balancing group. Each server in the group is provided with a copy of all data to be served, so that each server replicates data stored by every other server in the group.

In step 130, the domain name server assigns new requests by stepping through the list of server addresses, resulting in a crude and unpredictable load distribution for servers in the load-balancing group. Moreover, if the number of requests overloads the domain name server or if the server selected to service the request is at capacity, the service is ungracefully denied. In addition, if the selected server is at capacity, the new request routed by the domain name server may bring the server down.

Another major problem with DNS round robin is that the domain name server has no knowledge of server availability within the load-balancing group. If a server in the group is down, DNS round robin will nevertheless direct traffic to it.

In the mid 1990's, second generation load-balancing solutions were released. These solutions employed a dedicated load balance director (LBD), such as Cisco Systems's Local Director. The director improves the DNS round robin load-balancing scheme by periodically testing the network port connections of each server in its group and direction responses to responsive servers. One such second generation solution is discussed in "Load Balancing: A Multifaceted Solution for Improving Server Availability" (1998 Cisco Systems, Inc.,) submitted to the United States Patent and Trademark Office for their files pertaining to this patent.

A third generation of load-balancing solutions included robust, dedicated load balancing and network management devices, such as the BIG-IP™ from F5 NETWORKS.™ These devices improve server availability by monitoring server health via management protocols such as Simple Network Management Protocol (SNMP). Perhaps the biggest improvement of this generation is the ability to direct traffic based on requested content type instead of just load. For example, requests ending in ".http" are directed to Web servers, ".ftp" to file download servers, and ".ram" to REALNETWORKS'™ streaming servers. This feature enables network managers to create multiple load-balancing groups dedicated to specific content types.

Although the aforementioned load-balancing techniques are often adequate for managing multi-server systems that serve Web pages, file downloads, databases, and email, they still leave room for significant improvement. Moreover, such load-balancing schemes do not perform well in systems that serve broadcast-quality digital content, which is both time sensitive and bandwidth intensive.

SUMMARY OF THE INVENTION

A system and method for load balancing a plurality of servers is disclosed. In a preferred embodiment, a plurality of servers in a video-on-demand or other multi-server system are divided into one or more load-balancing groups. Each server preferably maintains state information concerning other servers in its load-balancing group including information concerning content maintained and served by each server in the group. Changes in a server's content status or other state information are preferably proactively delivered to other servers in the group. Thus, for example, to maintain a current inventory of assets within a load-balancing group, each server provides notification to other servers in its group when an asset that it maintains is added, removed, or modified.

When a content request is received by any server in a load-balancing group, it evaluates the request in accordance with a specified algorithm to determine whether it should deliver the requested content itself or redirect the request to another server in its group. In a preferred embodiment, this determination is a function of information in the server's state table.

The present system and method provide several benefits. First, because they employ a peer-based balancing methodology in which each server can respond to or redirect client requests, the present system and method do not present a single point of failure, as do those schemes that utilize a single load-balancing director. Second, because the present system and method proactively distribute state information within each group, each server is made aware of the current status of every server in its group prior to a client request. Consequently, when a request for content is received, it may be rapidly directed to the appropriate server without waiting for polled status results from other servers in the group. Moreover, in some preferred embodiments, the present system and method defines parameters concerning the capability of each server such as extended memory, inline adaptable cache, or other unique storage attributes, thus permitting sophisticated load-balancing algorithms that take account of multiple factors that may affect the ultimate ability of the system to most efficiently respond to client requests. Furthermore, in some preferred embodiments, the present system and method considers other media asset parameters such as whether an asset is a "new release" to help anticipate demand for the asset.

In one aspect, the present invention is directed to a method for selecting a server from a plurality of servers to service a request for content, comprising: designating a director from the plurality of servers to receive the request, wherein the designation is made on a request-by-request basis; and allocating to the director the task of selecting a server to service the request from the plurality of servers, said server having stored thereon the content, the director using a state table comprising parametric information for servers in the plurality of servers, wherein said parametric information comprises information identifying assets maintained on each server in the plurality of servers.

In another aspect of the present invention, the step of designating comprises designating the director in a round-robin fashion.

In another aspect of the present invention, the step of designating comprises designating the director on the basis of lowest load.

In another aspect of the present invention, the step of selecting further comprises selecting the director if the content is present on the director.

In another aspect of the present invention, said parametric information further comprises functional state and current load of each server.

In another aspect of the present invention, said parametric information further comprises whether each server comprises extended memory.

In another aspect of the present invention, said parametric information further comprises whether each server comprises an inline adaptable cache.

In another aspect of the present invention, said parametric information further comprises whether each asset is a new release.

In another aspect of the present invention, the method further comprises rejecting the request if the content is not present on any of the plurality of servers.

In another aspect of the present invention, the method further comprises forwarding the request to the selected server.

In another aspect of the present invention, The method further comprises redirecting the request to the selected server.

In another aspect of the present invention, the step of selecting further comprises: calculating a load factor for each server in the plurality of servers having the content; identifying as available servers one or more servers whose parameters are below threshold limits; selecting a server from the available servers having the lowest load factor; and otherwise selecting a server having the lowest load factor from the plurality of servers having the content.

In another aspect, the present invention is directed to a server for directing a request for content among a plurality of servers comprising: a state table comprising parametric information for each server in the plurality of servers, said parametric information comprising information identifying assets maintained on the plurality of servers; and a communication component for sending changes to the state table to the plurality of servers.

In another aspect of the present invention, the server is a member of a load-balancing group, and the communication component sends changes to servers in the load-balancing group.

In another aspect of the present invention, the server further comprises a redirection means for acknowledging the client request and identifying one of the plurality of servers where the requested asset is stored.

In another aspect of the present invention, the server further comprises a forwarding means for sending the client request to one of the plurality of servers where the requested asset is stored.

In another aspect of the present invention, said parametric information further comprises functional state and current load of each server.

In another aspect of the present invention, said parametric information further comprises whether each server comprises extended memory.

In another aspect of the present invention, said parametric information further comprises whether each server comprises an inline adaptable cache.

In another aspect of the present invention, said parametric information further comprises whether each asset is a new release.

BRIEF DESCRIPTION OF THE DRAWINGS

FIG. 8 is a diagram illustrating an exemplary state table in a preferred embodiment of the present system and method.

DESCRIPTION OF THE PREFERRED EMBODIMENTS

Figure 1:
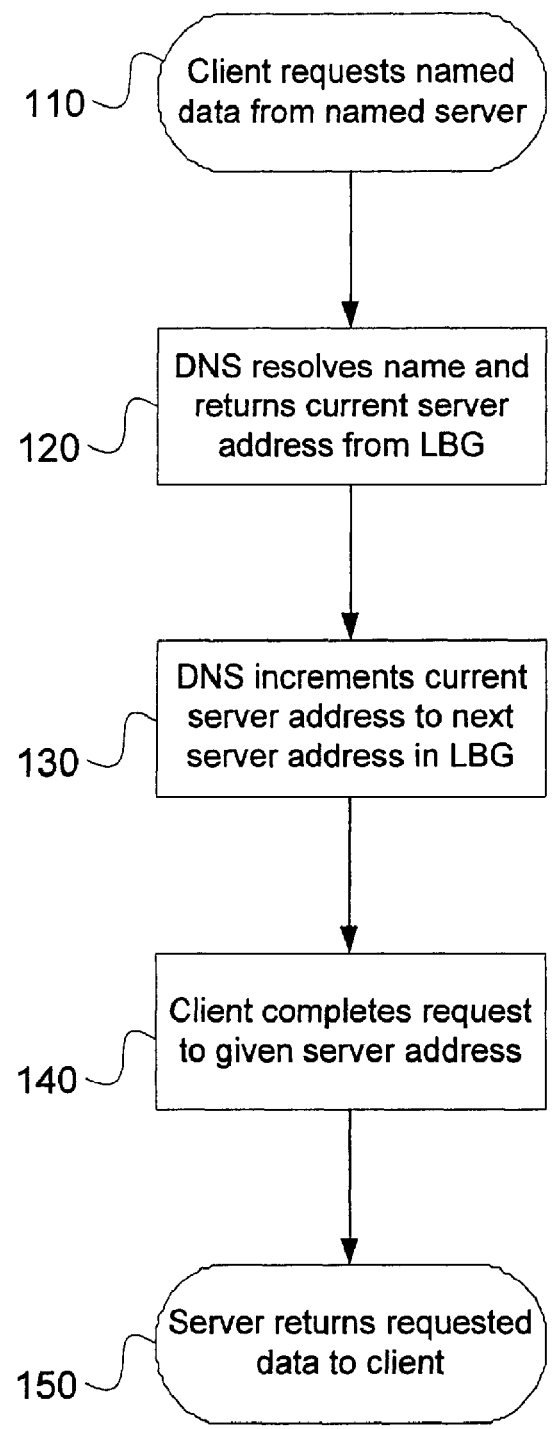
FIG. 1 is a flowchart illustrating a DNS round robin load-balancing scheme in the prior art.
Figures 2, 3:
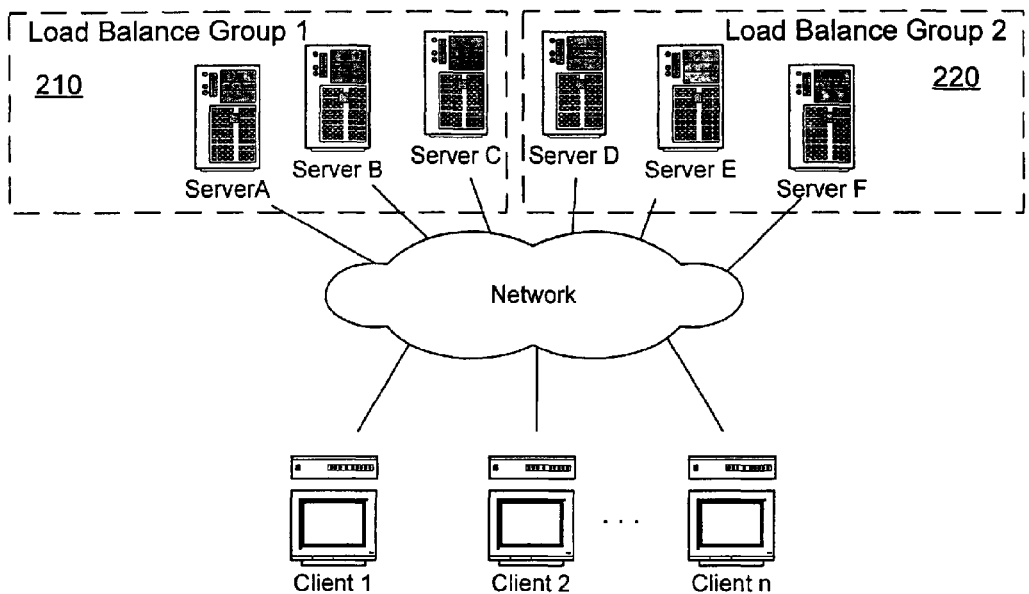
FIG. 2 is a block diagram illustrating an exemplary designation of servers into load-balancing groups.
FIG. 3 is a diagram illustrating exemplary state tables in a preferred embodiment of the present system and method.

FIG. 2 shows an exemplary digital media delivery system that includes six digital media servers A-F which provide content to a plurality of clients via a network. In the exemplary embodiment of FIG. 2, the six servers are divided into two load-balancing groups (LBG) 210, 220. Servers A-C are designated as belonging to load-balancing group 1 (210) and servers D-F are designated as belonging to load-balancing group 2 (220). Load-balancing groups 210, 220 may or may not be geographically diverse, but are logical groupings that designate which servers will share state information in a preferred embodiment of the present system and method, as described below.

Each server A-F preferably maintains state information concerning one or more parameters associated with each server in its group. Accordingly, each of servers A-C preferably maintains such state information for servers A-C and each of servers D-F preferably maintains such state information for servers D-F.

One preferred embodiment for maintaining state information concerning servers in a load-balancing group is shown in FIG. 3. As shown in FIG. 3, a first table 310 preferably comprises a row for each server in load-balancing group 210 and a second table 320 preferably comprises a row for each server in load-balancing group 220. Each table 310, 320 also preferably comprises a plurality of columns for storing state information concerning a plurality of parameters that may be considered in load-balancing determinations, as described below. Such parameters may include, without limitation, Moving Picture Experts Group (MPEG) bandwidth limits, total external storage capacity, addressable service groups (i.e., customer set-top boxes), current number of streams, system central processing unit (CPU) utilization, user CPU utilization, CPU idle, outgoing stream bandwidth, incoming bandwidth for network interfaces, streaming server state, system uptime, time-averaged load, server temperature, memory usage, total available cache, cache used, total external storage remaining, total external storage used, MPEG stream count limit, status of network connections, and status of power supplies, fans, and storage devices.

In a preferred embodiment, one or more of the stored parameters relate to the asset inventory of each server. The state table may also store other media asset parameters such as whether the asset is a "new release" to help anticipate demand for the asset. The state table additionally may contain parameters concerning the capability of each server such as whether it comprises extended memory or an inline adaptable cache (such as that described in U.S. patent application Ser. No. 10/609,433, now U.S. Pat. No. 7,500,055, entitled "ADAPTABLE CACHE FOR DYNAMIC DIGITAL MEDIA", filed Jun. 27, 2003, which is hereby incorporated by reference in its entirety for each of its teachings and embodiments), or other unique storage attributes.

In a preferred embodiment, an adaptable cache is a compact storage device that can persist data and deliver it at an accelerated rate, as well as act as an intelligent controller and director of that data. Incorporating such an adaptable cache between existing storage devices and an external network interface of a media server, or at the network interface itself, significantly overcomes the transactional limitations of storage devices, increasing performance and throughput for an overall digital media system.

In one embodiment, a user request may be received at a network interface and forwarded to a host processor via an I/O bus. The host processor may send a request for the asset to the storage system the I/O bus. The adaptable cache may monitor asset requests that traverse the I/O bus and determine if the requested asset is available on the adaptable cache. If the asset is available on the adaptable cache, it may be returned to the host processor. Otherwise, if the requested resource is unavailable from the adaptable cache, the request may be forwarded to the storage system for delivery to the appropriate storage device where the resource persists. The storage device may then return the resource to the requesting application. The adaptable cache may be adapted to monitor received requests, proactively cache some or all of an asset in accordance with caching rules, and notify one or more applications or processes of content that it is currently storing. Alternatively or in addition, the adaptable cache may be adapted to direct the storage system not to respond to requests for particular assets when the assets are cached in the adaptable cache.

Alternatively or in addition, an adaptable cache may be adapted to perform interval caching wherein a sorted list of pairs of overlapping requests for the same asset is maintained that identifies pairs of requests with the shortest intervals between their start times. For these pairs, as the first request in the pair is streamed, the streamed content is also cached and then read from cache to serve the second request.

In a preferred embodiment, threshold limits may be specified for one or more of the stored parameters that represent an unacceptable condition. Use of these threshold limits in selecting a server to deliver requested content is described in more detail below.

Figure 4:
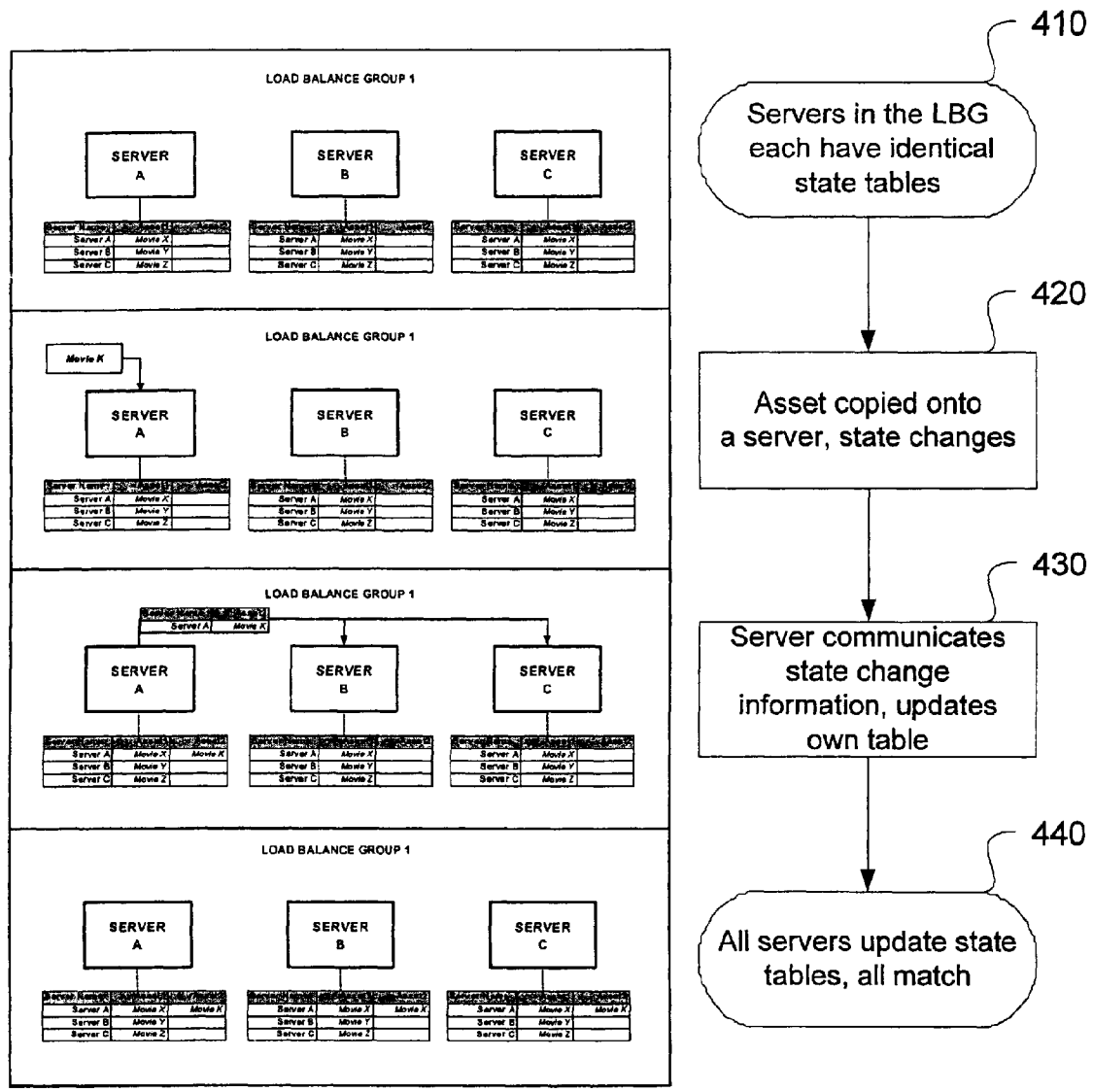
FIG. 4 is a flowchart illustrating a preferred embodiment of a process for updating state tables.

A preferred embodiment for updating state tables 310, 320 at each server is illustrated in FIG. 4. As shown in FIG. 4, in step 410, all servers in a load-balancing group initially have identical state tables. In step 420, a parameter of server A is modified (e.g., an asset is copied onto server A), thus changing server A's state. In step 430, server A updates its own state table, and pushes the state change information to all other servers in its load-balancing group. In a preferred embodiment, this state change information is transmitted concurrently to all other servers in the group via, for example, a multicast, broadcast, or other one-to-many communications mechanism. In step 440, the other servers update their state tables with the state change information, and the state tables of all servers are again synchronized. In addition, each server is preferably adapted to add or remove parameter columns from its state tables, so that load-balancing algorithms applied by the servers may change over time and take account of different combinations of parameters.

Figure 5A:
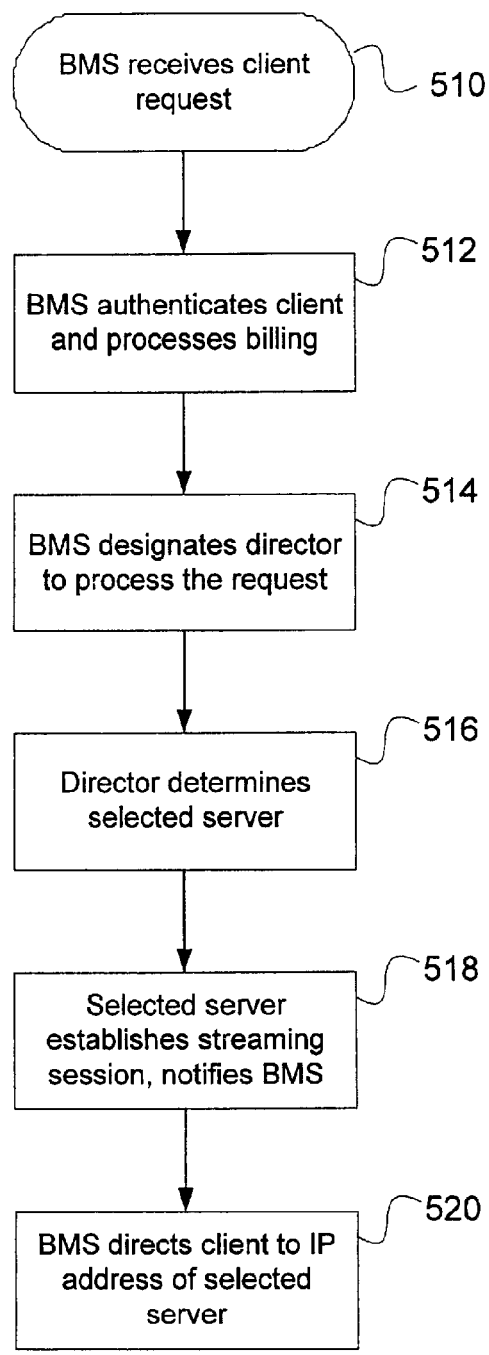
FIG. 5A and 5B are flowcharts illustrating a preferred embodiment of the present system and method for load-balancing in a multi-server system.

FIG. 5A illustrates a preferred embodiment for responding to a request for content from, for example, a client set-top box. In step 510, the content request is received by a business management system (BMS) of the digital media delivery system. The business management system is preferably adapted to provide billing, authentication, conditional access, programming guide information, and other functions to client set-top boxes.

In step 512, the business management system authenticates the client and bills the client for the request. In step 514, the business management system designates one of the media servers of the digital media delivery system to act as a director for this request. The role of the director is to select an appropriate server to deliver the requested content to the client, as described below. In a preferred embodiment, the director may be selected by the business management system on a rotating basis. In an alternative preferred embodiment, the director may be selected on the basis of server load (i.e., the server with lowest current load is designated to act as director for the request).

In step 516, the server designated to act as director for this request selects a server from its load-balancing group to deliver the requested content to the client. As described below, this server may be the director itself or another server in its group. Preferred embodiments for making this selection are described below in connection with FIGS. 5B and 6.

In step 518, the server selected to deliver the content sets up a streaming session and notifies the business management system that it is ready to stream the requested content to the client. In step 520, the business management system directs the client to the IP address of the selected server and delivery of the requested content is commenced.

In an alternative preferred embodiment, after selecting a server to act as director for a request, the business management system provides the director's IP address directly to the client. In this embodiment, the client contacts the director which selects a server to provide the requested content and then provides that server's IP address to the client when the streaming session is set up.

Figure 5B:
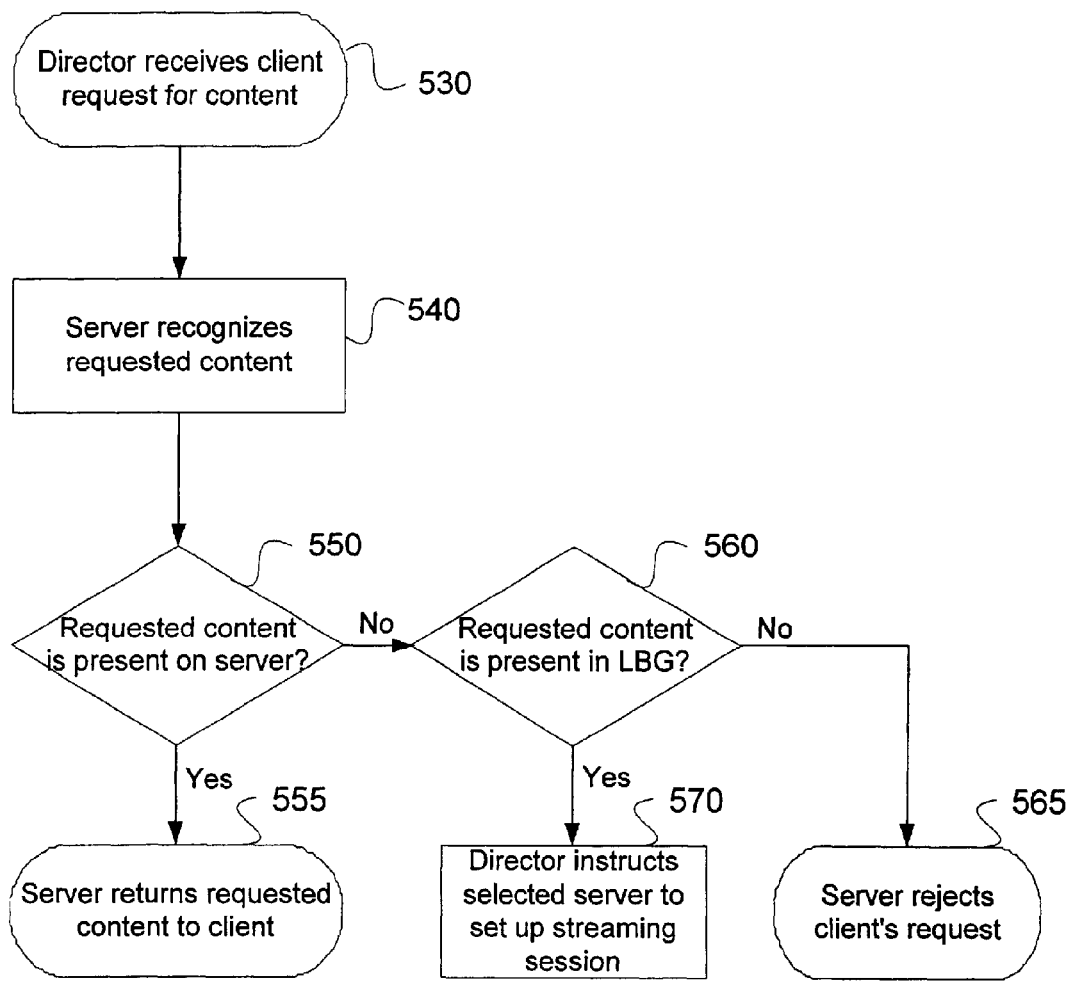

One preferred embodiment that may be utilized by a director for selecting a server to deliver requested content is now described in connection with FIG. 5B. As shown in FIG. 5B, in step 530, a content request is received by the server designated by the business management system to act as director for the request. In step 540, the director identifies the requested content and determines whether or not the director has this content available. If the content is available from the director itself (step 550), it designates itself to deliver the requested content (step 555). Otherwise, in step 560, the server examines its state table 310 to see if the content is available from another server in its load-balancing group. If the content is not available in the group, the director rejects the request (step 565). Otherwise, as described above, the director instructs the selected server to set up a streaming session for the client and redirects the client to submit the request to that server when the session is set up (step 570). Two alternatives to step 570 are described respectively in connection with FIGS. 5C and 5D. In the first alternative, the director forwards the request to the selected server which directly respond to the client when the streaming session is set up. In the second alternative, the director redirects the client to the selected server and the client directly requests establishment of a streaming session from the selected server.

Figure 5C:
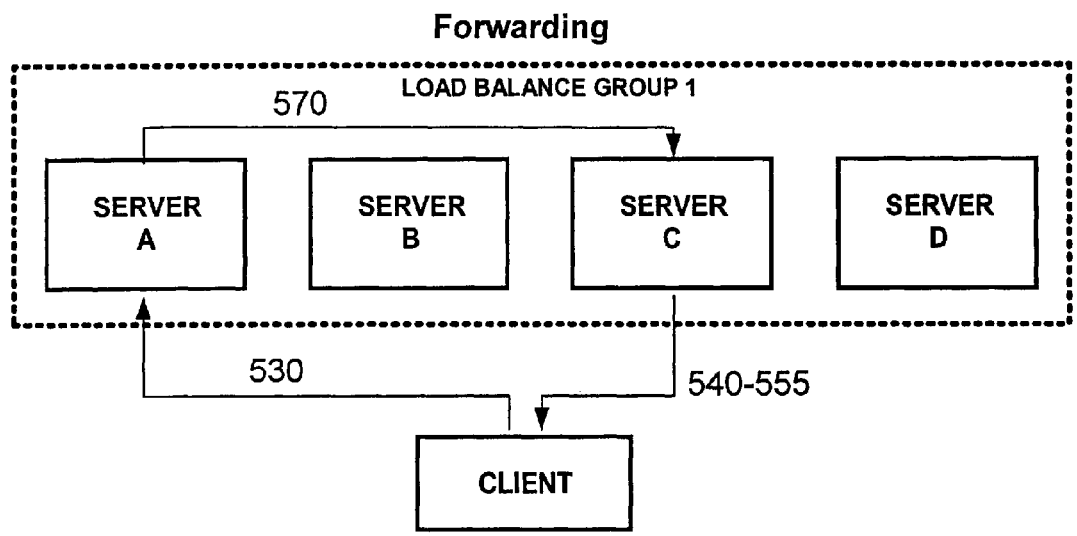
FIGS. 5C and 5D are block diagrams illustrating the communication paths for forwarding and redirecting client content requests in a preferred embodiment of the present system and method.

This first alternative is illustrated in an exemplary communication block diagram shown in FIG. 5C. More specifically, as shown in FIG. 5C, in step 530, server A receives a request from the client. In step 570, server A concludes that a different server in the group can service the request (server C in this example), and forwards the request to that server. Server C processes the forwarded request as if it were received directly from the client, and performs steps 540-555 shown in FIG. 5B to deliver the requested content to the client.

Figure 5D:
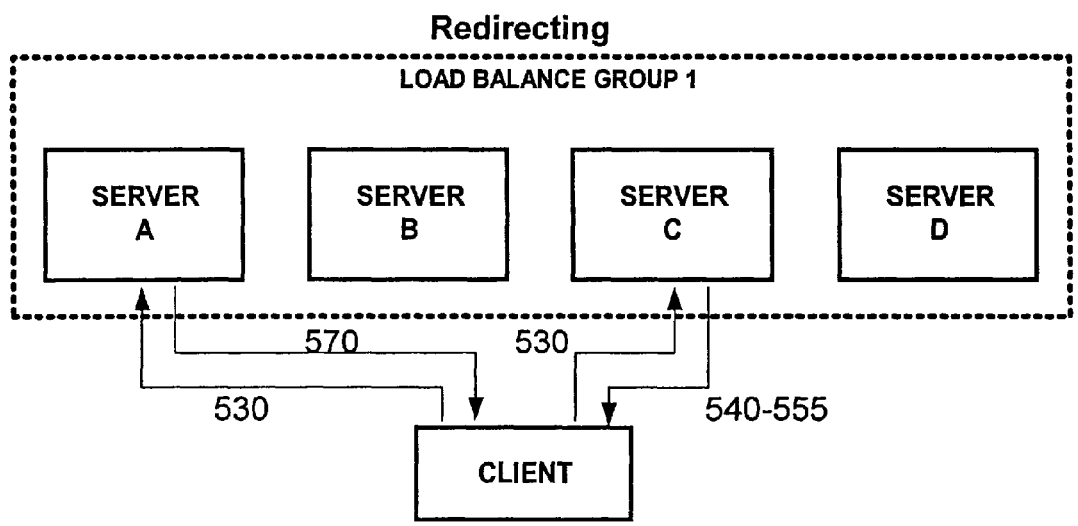

Turning to FIG. 5D which illustrates the second alternative, in step 530, server A receives a request from the client. In step 570, server A concludes that a different server in the group can service the request (server C in this example), and sends an acknowledgment to the client, redirecting the client to that server. The client then retransmits its request to server C (step 530). Server C processes the request, and performs steps 540-555 shown in FIG. 5B to deliver the requested content to the client.

Figure 6:
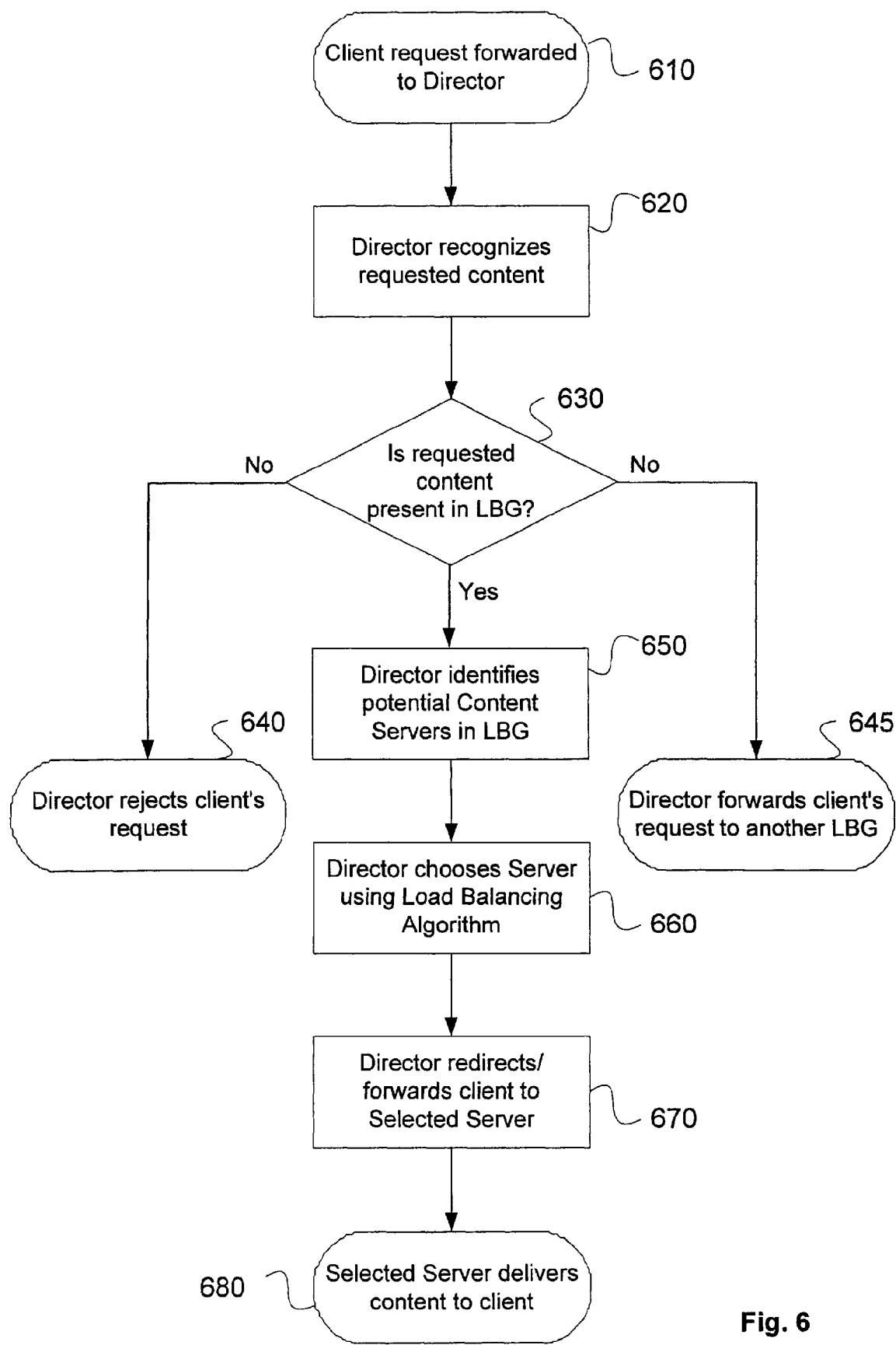
FIG. 6 is a flowchart illustrating a preferred embodiment of the present system and method for load-balancing in a multi-server system with replicated content.

In a preferred embodiment, content may be replicated on multiple servers in a load-balancing group to satisfy request volumes that may exceed a single server's capacity. Moving or copying content from one server to another in a load-balancing group may also be used as a strategy to further distribute load within the group. FIG. 6 illustrates a preferred system and method for load-balancing content requests in a multi-server system with replicated content.

As shown in FIG. 6, in step 610, a client makes a request for content. The request is forwarded to a business management system which designates a server as director for this request and forwards the request to the director, as described above. In step 620, the director analyzes the request to identify the requested content. In step 630, the director determines if the requested content is present in the load-balancing group by consulting its state table. If the content is not present in the load-balancing group, the director rejects the request (step 640).

In an alternative embodiment, the director may forward the request to a server in another load-balancing group. This alternative, however, suffers from significant drawbacks, because the director in the present embodiment has no knowledge whether the content is present in the other load-balancing groups, and a poor level of service may result depending upon the ability of a second load-balancing group to provide the content. To overcome this drawback, each server may be provided with additional state tables with information concerning servers in other load-balancing groups. Alternatively, all servers in the system may be designated as belonging to a single load-balancing group. These alternatives, however, present their own disadvantages including increased overhead to update and maintain state tables.

Returning to FIG. 6, if the content is available in the load-balancing group, the server examines its state table to identify those servers in the group that have the requested content (step 650). In step 660, the server applies a load-balancing algorithm to choose a server in its group to supply the requested content. One preferred embodiment of such an algorithm is described in more detail below. In step 670, the client request is redirected or forwarded to the selected server as described above in connection with FIGS. 5B-5D. In step 680, the selected server delivers the requested content to the client. In step 690, the selected server updates its state table to reflect corresponding changes in its load and other parameters and communicates these state-table changes to the other servers in its load-balancing group.

Figure 7:
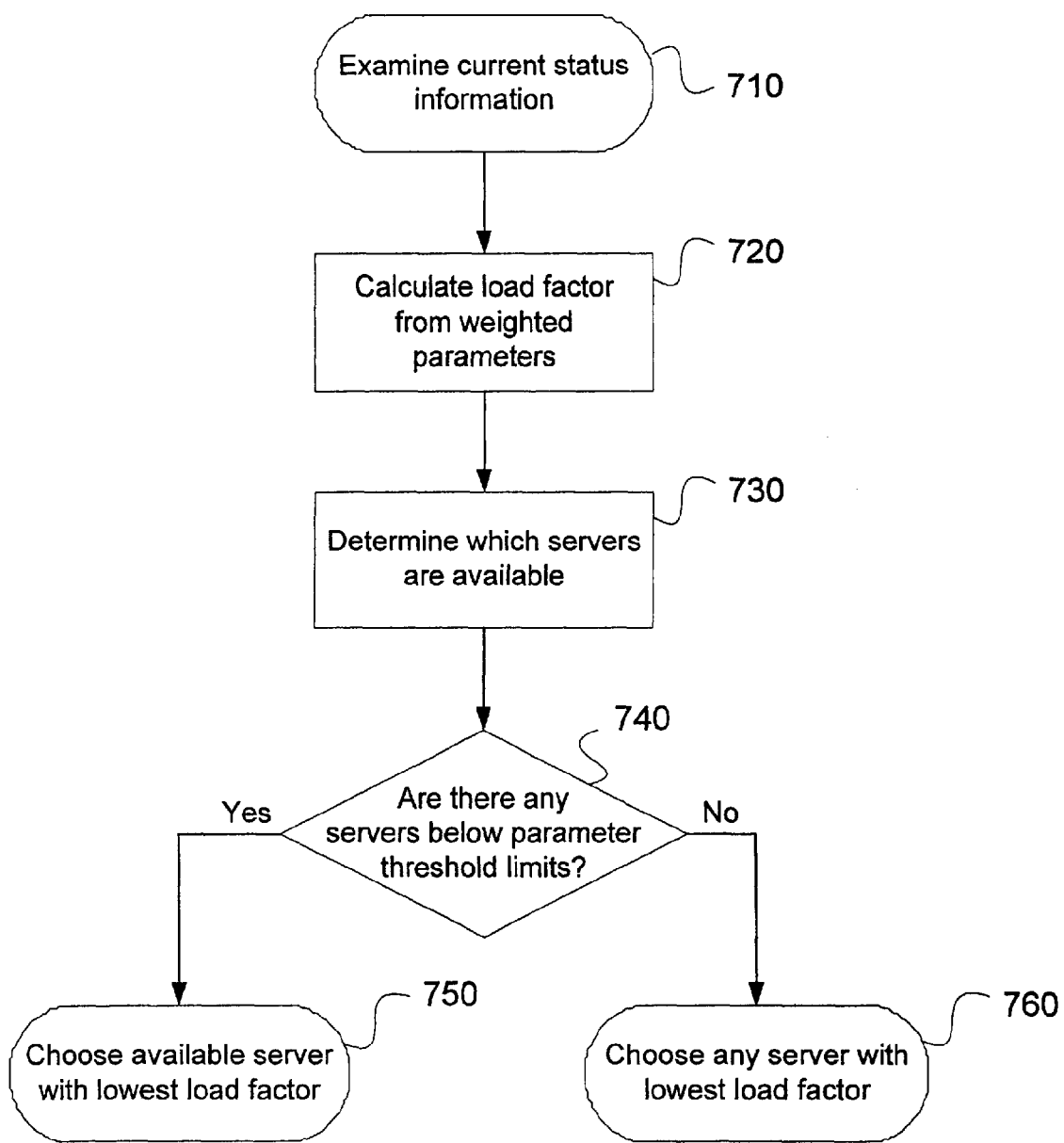
FIG. 7 is a flowchart illustrating a preferred load-balancing algorithm.

A preferred embodiment of a load-balancing algorithm for selecting a server to deliver requested content is illustrated in FIG. 7. As shown in FIG. 7, in step 710, the director examines its state table to identify all servers in its load-balancing group that have the requested content and are operational (referred to hereafter as target servers).

In step 720, the server calculates a load factor for each of the target servers from a weighted sum of parameters indicative of load. In a preferred embodiment, the parameters used to calculate the load factor for each server are: incoming streaming bandwidth, outgoing streaming bandwidth, total storage usage, memory usage, and CPU utilization.

In step 730, the server determines whether any target servers have exceeded a parameter threshold limit. For example, a target server may have an abundance of outgoing streaming bandwidth available, but the server's CPU utilization parameter may be very high and exceed the threshold limit established for that parameter. This target server would therefore not be a preferred choice to serve the requested content. As used herein, the term available servers refers to target servers that have not exceeded any threshold limits.

In step 740, the server determines if there are any available servers. If so, in step 750, the server chooses the available server having the lowest load factor to deliver the requested content. If not, then in step 760, the server chooses the target server having the lowest load factor from all target servers.

FIG. 8 shows an exemplary state table suitable for illustrating the above-described process of FIG. 7. For purposes of the present example, it is assumed that the three listed servers A-C are members of load-balancing group 1 and that each maintains the exemplary state table of FIG. 8. It is further assumed that a client places a request to view the asset "Dare Devil," a feature-length film.

The director, assume server B, examines its state table and determines that the content for "Dare Devil" is stored on servers A and C. Since servers A and C are up, they are the target servers.

Server B then calculates the load factor for each of the target servers. The load factor is preferably defined to be a weighted average of parameters. For the purpose of this example, it is assumed that the bandwidth capacity, both incoming and outgoing, is 500, and the load factor is expressed as an average of each parameter, measured in percent capacity. Thus, server B would determine the load factor of server A as $(4700/500+27500/500+34+37+40)/5\%=35\%$, and the load factor of server C as $(1300/500+39600/500+56+60+64)/5\%=52.4\%$.

Next, server B determines whether both servers are available. For the purpose of this example, it is assumed that the threshold limit set for each parameter on each server is 75%. Since no threshold limits are exceeded by any target server, servers A and C are both available servers. Since there is at least one available server, server B chooses the server with the lowest load factor, namely server A.

As server A starts supplying the "Dare Devil" content, it updates its state-table parameters to reflect this fact (e.g., overall load, bandwidth, etc.). Server A preferably broadcasts these changes to all other servers in its load-balancing group, as described above.

While the invention has been described in conjunction with specific embodiments, it is evident that numerous alternatives, modifications, and variations will be apparent to persons skilled in the art in light of the foregoing description.

What is claimed is:

1. A method comprising:
   designating a director server from among a plurality of servers configured to service requests for assets and configured to function as a director server if designated, each of the plurality of servers further configured with a storage system and an adaptable cache configured to proactively cache assets;
   receiving a first request and a second request for an asset at a network interface of the designated director server;
   forwarding the first request and the second request to a host processor of the designated director server over a bus;
   determining whether or not the asset is present on the designated director server;
   if the asset is present on the designated director server, servicing the first request and the second request from the designated director server by:
      monitoring the bus by a designated director server's adaptable cache,
      detecting the first request and the second request on the bus at the designated director server's adaptable cache,
      generating, at the designated director server's adaptable cache, a list of pairs of requests for the asset comprising a first pair of requests comprising the first request and the second request,
      determining that the first pair of requests has the shortest interval between start times from among pairs of requests identified in the list of pairs of requests,
      responsive to the first request, streaming the asset from a designated director server's storage system and storing the asset on the designated director server's adaptable cache as it is being streamed from the designated director server's storage system, and
      responsive to the second request, streaming the asset from the designated director server's adaptable cache and transmitting an instruction from the designated director server's adaptable cache to the designated director server's storage system directing the designated director server's storage system not to respond to the second request; and
   if the asset is not present on the designated director server, selecting, by the designated director server based on a designated director server's state table, a first server in said plurality of servers to service the first request and the second request, said designated director server's state table comprising state information for said first server indicating that the asset is present on the first server.

2. The method of claim 1, wherein servicing the first request and the second request from the designated director server comprises updating a designated director's state table based on the servicing of the first request and the second request, and transmitting changes to the designated director's state table to each server in said plurality of servers.

3. The method of claim 1, wherein said designated director's state table comprises parametric information for servers in said plurality of servers, and wherein selecting, by the designated director server, the first server in said plurality of servers to service the first request and the second request comprises the designated director server selecting the first server using the designated director's state table, wherein said parametric information comprises information identifying assets maintained on each server in said plurality of servers.

4. The method of claim 3, wherein said parametric information further comprises information indicative of the functional state and current load of each server in said plurality of servers.

5. The method of claim 3, wherein said parametric information further comprises information indicative of whether each server in said plurality of servers comprises extended memory.

6. The method of claim 3, wherein said parametric information further comprises information indicative of whether an asset is a new release.

7. The method of claim 1, further comprising rejecting the request for an asset if the requested video is not present in said plurality of servers.

8. The method of claim 1, further comprising forwarding the first request and the second request to the first server.

9. The method of claim 1, further comprising redirecting the first request and the second request to the first server.

10. The method of claim 1, wherein selecting the first server comprises:
    calculating a load factor for servers in said plurality of servers having the asset;
    determining that no servers in said plurality of servers have parameters that are below threshold limits; and
    selecting a server having the lowest load factor from the servers in said plurality of servers having the asset.

11. A method comprising:
    responsive to an asset being copied onto a first server in a load balancing group, modifying, by said first server, said first server's state information table by placing an identifier for the asset in said first server's state information table, wherein said first server's state information table comprises state information for servers in said load balancing group, wherein said state information comprises a plurality of parameters concerning said servers in said load balancing group, and wherein the plurality of parameters comprise asset identifiers;
    pushing, by said first server, said identifier for the asset to all servers in said load balancing group;

modifying, by each server in said load balancing group, its respective state information table, by placing said identifier for the asset in its respective state information table;

receiving by said load balancing group a designation by a management system of a director server from among servers in said load balancing group, wherein each server in said load balancing group is configured to function as a director server if designated, and wherein each server in said load balancing group is further configured with a storage system and an adaptable cache configured to proactively cache assets;

receiving at a director server's network interface a first request and a second request for an asset, forwarding the first request and the second request to a director server's host processor over a bus;

determining whether or not the asset is present on the director server;

if the asset is present on the director server, servicing the request for the video asset by:
 monitoring the bus by a director server's adaptable cache,
 detecting the first request and the second request on the bus at the director server's adaptable cache,
 generating, at the director server's adaptable cache, a list of pairs of requests for the asset comprising a first pair of requests comprising the first request and the second request,
 determining that the first pair of requests has the shortest interval between start times from among pairs of requests associated with the list of pairs of requests,
 responsive to the first request, streaming the asset from a director server's storage system and storing the asset on the director server's adaptable cache as it is being streamed from the designated director server's storage system, and
 responsive to the second request, streaming the asset from the director server's adaptable cache and transmitting an instruction from the director server's adaptable cache to the director server's storage system directing the director server's storage system not to respond to the second request; and if the asset is not present on the director server, servicing the first request and the second request by:
 determining by said director server that the identifier for the asset in a director server's state information table is associated with a selected server in said load balancing group;
 transmitting an instruction from the director server to the selected server to stream the asset to a requesting client; and
 streaming by said selected server the asset to the requesting client.

12. The method of claim 11, wherein selecting by said director server the selected server in said load balancing group comprises selecting the selected server based on information in said director server's state information table indicating that the selected server has the asset stored in a selected server's adaptable cache.

13. The method of claim 11, further comprising updating a selected server's state table based on the streaming of the requested asset and transmitting changes to said selected server's state table from said selected server to each server in said load balancing group.

14. The method of claim 11, wherein said management system designates servers in said load balancing group as director server on the basis of lowest load.

15. The method of claim 11, wherein said plurality of parameters concerning said servers in said load balancing group comprise parameters that indicate whether one or more of assets maintained on said servers in the load balancing group are stored on an adaptable cache of each of the servers in the load balancing group.

16. A method comprising:
 designating, by a management system, a director server from among a plurality of servers configured to service requests for assets and configured to function as the director server if designated, each of the plurality of servers further configured with a storage system and an adaptable cache configured to proactively cache video assets;
 receiving a first request and a second request for a first asset at a network interface of the designated director server;
 forwarding the first request and the second request to a host processor of the designated director server over a bus;
 determining that the first asset is present on the designated director server;
 servicing the first request and the second request from the designated director server by:
  monitoring the bus by a designated director server's adaptable cache,
  detecting the first request and the second request on the bus at the designated director server's adaptable cache,
  generating, at the designated director server's adaptable cache, a list of pairs of requests for the first asset comprising a first pair of requests comprising the first request and the second request,
  determining that the first pair of requests has the shortest interval between start times from among pairs of requests associated with the list of pairs of requests,
  responsive to the first request, streaming the first asset from a designated director server's storage system and storing the first asset on the designated director server's adaptable cache as it is being streamed from the designated director server's storage system, and
  responsive to the second request, streaming the first asset from the designated director server's adaptable cache and transmitting an instruction from the designated director server's adaptable cache to the designated director's storage system directing the designated director's storage system not to respond to the second request;
 receiving a third request for a second asset at the designated director server;
 determining that the second asset is not present on the designated director server; and
 selecting, by the designated director server based on a designated director server's state table, a first server in said plurality of servers to service the third request, said designated director server's state table comprising state information for said first server indicating that the second asset is present on the first server.

17. The method of claim 16, wherein servicing the first request and the second request from the designated director server comprises updating the designated director's state table based upon the servicing of the first request and the second request and transmitting changes to the designated director's state table to each server in said plurality of servers.

18. The method of claim 16, wherein said designated director's state table comprises parametric information for servers in said plurality of servers, and wherein selecting, by the designated director server, the first server in said plurality of servers to service the third request comprises the designated director server selecting the first server using the designated director's state table, wherein said parametric information comprises information identifying assets maintained on said plurality of servers.

19. The method of claim 18, wherein said parametric information further comprises information indicative of the functional state and current load of each server in said plurality of servers.

20. The method of claim 18, wherein said parametric information further comprises information indicative of whether each server in said plurality of servers comprises extended memory.

21. The method of claim 18, wherein said parametric information further comprises information indicative of whether an asset is a new release.

22. The method of claim 16, further comprising rejecting the third request if the second asset is not present in said plurality of servers.

23. The method of claim 16, further comprising forwarding the third request to the first server.

24. The method of claim 16, further comprising redirecting the third request to the first server.

25. The method of claim 16, wherein selecting the first server comprises:
   calculating a load factor for servers in said plurality of servers having the second asset;
   determining as available servers one or more servers in said plurality of servers whose parameters are below threshold limits; and
   selecting the first server from the available servers having a lowest load factor.

* * * * *

UNITED STATES PATENT AND TRADEMARK OFFICE
CERTIFICATE OF CORRECTION

| | | |
|---|---|---|
| PATENT NO. | : 7,680,938 B2 | Page 1 of 1 |
| APPLICATION NO. | : 11/468613 | |
| DATED | : March 16, 2010 | |
| INVENTOR(S) | : Richard T. Oesterreicher et al. | |

It is certified that error appears in the above-identified patent and that said Letters Patent is hereby corrected as shown below:

Claim 7, line 2, delete "an" and insert --the-- therefor.

Claim 7, line 2, delete "requested video" and insert --asset-- therefor.

Claim 11, line 33, delete "video".

Claim 16, line 7, delete "video".

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,680,938 B2 | Page 1 of 1 |
| APPLICATION NO. | : 11/468613 | |
| DATED | : March 16, 2010 | |
| INVENTOR(S) | : Richard T. Oesterreicher et al. | |

It is certified that error appears in the above-identified patent and that said Letters Patent is hereby corrected as shown below:

Column 10, line 41 (Claim 7, line 2) delete "an" and insert --the-- therefor.

Column 10, line 41 (Claim 7, line 2) delete "requested video" and insert --asset-- therefor.

Column 11, line 20 (Claim 11, line 33) delete "video".

Column 12, line 13 (Claim 16, line 7) delete "video".

This certificate supersedes the Certificate of Correction issued June 15, 2010.

Signed and Sealed this

Twentieth Day of July, 2010

David J. Kappos
*Director of the United States Patent and Trademark Office*